United States Patent [19]

Phillips et al.

[11] Patent Number: 5,684,114
[45] Date of Patent: Nov. 4, 1997

[54] CROSS-CATALYZED PHENOL-RESORCINOL ADHESIVE

[75] Inventors: Earl K. Phillips, Springfield; William D. Detlefsen; Fred E. Carlson, both of Eugene, all of Oreg.

[73] Assignee: Borden Chemical, Inc., Columbus, Ohio

[21] Appl. No.: 487,317

[22] Filed: Jun. 7, 1995

Related U.S. Application Data

[62] Division of Ser. No. 192,077, Feb. 4, 1994.

[51] Int. Cl.$^6$ .............................. C08G 8/04; C08G 14/02
[52] U.S. Cl. ...................... 528/129; 528/129; 528/137; 528/147; 528/155; 528/156; 528/163; 525/489; 525/490; 264/319; 264/331.11; 264/331.22
[58] Field of Search ................................ 528/129, 137, 528/147, 155, 156, 163; 525/489, 490; 264/319, 331.11, 331.22

[56] References Cited

U.S. PATENT DOCUMENTS

| | | | |
|---|---|---|---|
| 3,705,832 | 12/1972 | Stephan et al. | 528/129 |
| 4,961,795 | 10/1990 | Detlefsen et al. | 528/129 |
| 4,977,231 | 12/1990 | McVay et al. | 528/129 |
| 5,075,413 | 12/1991 | Dailey, Jr. | 528/129 |
| 5,075,414 | 12/1991 | Dailey, Jr. | 528/129 |

OTHER PUBLICATIONS

Patent Abstracts of Japan, vol. 15 No. 154 (C-0825) Apr. 18, 1991.
Chemical Abstracts, vol. 78, No. 14, Apr. 9, 1973, Zabrodkin et al.

*Primary Examiner*—Samuel A. Acquah
*Attorney, Agent, or Firm*—Watson Cole Stevens Davis, PLLC

[57] ABSTRACT

A two-part adhesive is provided wherein the first part comprises a stable aqueous alkaline monohydroxylic phenolic resole resin solution containing a methylene donor such as oxazolidine or a methylolurea and the second part comprises a stable resorcinolic resin precondensate having a shortage of formaldehyde and optionally containing a catalyst such as an ester functional compound for the resole resin. The resin in each part exhibits viscosity stability of an unmodified resin until mixed with the other part wherein the methylene donor, of the first part catalyzes the resorcinolic resin of the second part and the catalyst, when used, of the second part catalyzes the monohydroxylic phenolic resole resin of the first part. The adhesive finds utility in the production of structural lignocellulosic panels.

4 Claims, No Drawings

CROSS-CATALYZED PHENOL-RESORCINOL ADHESIVE

This is a division of application Ser. No. 08/192,077, filed Feb. 4, 1994.

BACKGROUND OF THE INVENTION

1. Field of the Invention

This invention relates to an adhesive in two parts. The two parts are mixed together immediately prior to use. Part One is a stable aqueous alkaline phenolic resole resin solution containing a methylene donor. Part Two is a stable resorcinolic precondensate resin having a shortage of formaldehyde which optionally contains a catalyst for curing the resole resin. Each part exhibits viscosity stability of the respective resin similar to that without the methylene donor or catalyst until the two parts are mixed. On mixing, the methylene donor of Part One reacts with the resorcinolic resin of Part Two and the catalyst in Part Two reacts with the phenolic resole resin of Part One to cause adhesive gelation and cure of the resins. The adhesive is particularly useful for the manufactured of lignocellulosic panels such as strandboard.

2. Description of the Prior Art

Aqueous alkaline monohydroxylic phenolic resole resins are used in the structural board industry as durable binders to produce panel products intended for limited exterior use. Such resins have long been plagued with some drawbacks including a relatively long curing time and sensitivity to high moisture levels. Adhesive improvements in recent years have shortened curing times and reduced moisture sensitivity, but advances in these areas are still desirable. The introduction of polymeric isocyanate (polymeric methylene diisocyanate, or PMDI) as a binder for structural boards offers a new performance benchmark for phenolic resole resins. PMDI is a very fast curing adhesive that is relatively unaffected by wood moisture in the normal range encountered in a panel manufacturing plant. PMDI is very expensive, though, and questions are being raised about worker health concerns in plants using the adhesive.

The use of phenolic resole resin curing catalysts are known, e.g., such as those described in U.S. Pat. Nos. 4,831,067 of May 16, 1989 to Lemon et al; and 4,961,795 of Oct. 9, 1990 to Detlefsen and Phillips. The above mentioned Detlefsen and Phillips patent is also concerned with methods for accelerating the cure of phenolic resole resins in the manufacture of lignocellulosic panels. The following patents are also concerned with methods for accelerating the cure of phenolic resole resins: U.S. Pat. Nos. 4,373,062 of Feb. 8, 1983 to Brown which uses a phenol-formaldehyde resole resin to which resorcinol is added and subsequently cured with formaldehyde; and 4,977,231 of Dec. 11, 1990 to McVay which discusses shortcomings of phenolic resole resins including the use of ester functional curing agents such as propylene carbonate. McVay uses certain carbamate catalysts to solve the problem of slow cure.

Kirk-Othmer, Encyclopedia of Chemical Technology, Third Edition, Volume 13, pages 58 and 59 describes resorcinol adhesives as room temperature curing and water resistant and states that resorcinol-formaldehyde and resorcinol modified phenol-formaldehyde resins are used to laminate wood. Also, Knop and Pilato, *Phenolic Resins*, 1985, page 13, states that resorcinol or resorcinol-formaldehyde prepolymers can be used as accelerating compounds for curing phenolic resins and that the addition of 3% to 10% of such compounds permits a shorter cure cycle in the manufacture of particle board.

Resorcinol is very expensive in relation to phenol and mixtures of resorcinol resin in monohydroxylic phenolic resole resins are not efficient from the standpoint of the increase in performance in relation to the amount of resorcinol resin needed. Additionally, for curing of such resins prepared from both resorcinol and phenol, the prior art added formaldehyde or para-formaldehyde to the mixture.

Resorcinolic resins will not cure without the addition of an alkylene donor such as a methylene donor, e.g., formaldehyde or hexamethylenetetramine (hexamine). However, with such a methylene donor, resorcinolic resins have the ability to cure at room temperature and at elevated moisture contents. Resorcinolic resins are made with a deficiency of formaldehyde so as to be stable until the time of use, at which time sufficient formaldehyde or other methylene donor is used to cure the resin.

Another source of methylene donors for resorcinolic resins is a class of chemicals called oxazolidines. These can be reaction products of formaldehyde and certain amino alcohols derived from nitroparaffins. The oxazolidines react with resorcinolic resin solutions which lack formaldehyde, in the manner of formaldehyde, without actually releasing formaldehyde to the solution or to the atmosphere. The use of oxazolidine to catalyze resorcinolic resins, including phenol-resorcinol resins is shown in the following U.S. Pat. Nos. 3,256,137 of Jun. 14, 1966 to Danielson; 3,281,310 of Oct. 25, 1966 to Danielson; 3,698,983 of Oct. 17, 1972 to Bryant; 3,705,832 of Dec. 12, 1972 to Stephan; and 3,517,082 of Jun. 23, 1970 to Gockerham. Technical Review, TR No. 4 of the Angus Chemical company also describes oxazolidines as useful curing additives of phenol-formaldehyde and one stage phenolic resins.

In this invention, Part One, of the two-part adhesive of this invention comprising the methylene donor and the alkaline monohydroxylic phenolic resole resin are stable. Part Two which comprises the resorcinolic resin and optionally the catalyst for the resole resin of Part One is also stable. On mixing of the two parts the methylene donor of Part One catalyzes the resorcinolic resin of Part two and when Part Two also contains a catalyst for the resole resin such catalyst catalyzes the resole resin of Part One. The mixture of the Part One and Part Two components, i.e. the adhesive, is applied to lignocellulosic material in the manufacture of composition board which is eventually pressed and heated to cure the adhesive.

SUMMARY OF THE INVENTION

The problem solved by applicants involves methods and compositions for efficiently, conveniently and economically accelerating the cure of monohydroxylic phenolic resole resins without release of formaldehyde while improving properties of lignocellulosic panels prepared with the adhesive. Such properties are better than those when the resin is used alone and more efficient and convenient than the prior art mixture of resins or copolymers containing resorcinol. This invention allows lower resin usage levels than with a conventional monohydroxylic phenolic resole resin or a resorcinolic resin. There is a synergy in the approach of this invention which yields unexpectedly high adhesive properties at moderate expense.

This invention provides cure times when manufacturing lignocellulosic panels which are much faster than conventional phenolic resole resins when the Part One component contains a methylene donor irrespective of whether the Part 2 component contains a catalyst for the resole resin. When the Part Two component contains a catalyst for the resole resin of Part One, the cure times are essentially equivalent to that of polymeric isocyanate. The adhesive compositions of this invention are also capable of curing under high moisture and low temperature conditions.

In one aspect of this invention there is provided an adhesive prepared from two parts wherein one part, referred to as Part One, comprises a stable mixture of a monohydroxylic phenolic resole resin with a methylene donor. The methylene donor in Part One does not emit formaldehyde fumes from the resole resin. The other part, referred to as Part Two, comprises a stable mixture of a resorcinolic resin with a catalyst for the resin of Part One. When the two parts are mixed together, the catalyst of each part polymerizes the resin of the other part.

In another aspect, the invention comprises an adhesive prepared from two parts wherein Part One comprises a stable mixture of phenolic resole resin with a methylene donor which does not fume in the resole resin and the other part, namely, Part Two, comprises a resorcinolic resin without a catalyst for the resin of Part One.

In still a further aspect, the invention comprises lignocellulosic panels prepared by mixing the above mentioned adhesive parts and applying the mixture to lignocellulosic components which are subsequently subjected to heat and pressure to cure the resins and form the bond for the panels.

Additional aspects include methods for the preparation and use of the above mentioned compositions and articles.

The methods and compositions of this invention provide additional advantageous properties such as: good lignocellulosic board properties; high curing speed with relatively small quantities of resorcinol; moisture tolerance; use of small quantities of total resin; good handling properties of the resin; greater binder efficiency in that lower quantities of the mixed adhesive can be used as compared to a resole resin.

Resorcinolic resins need a cross-linker such as formaldehyde to cure but adding formaldehyde to a resorcinolic resin causes fuming and other problems. Use of the methylene donors of this invention which are stable in the resole resin, overcome such problems.

DETAILED DESCRIPTION OF THE INVENTION

The Alkaline Monohydroxylic Phenolic Resole Resin

The monohydroxylic phenolic resole resin, also referred to herein simply as resole resin, can be any conventional aqueous alkaline resole resin solution made with a monohydroxylic phenol suitable for use as an adhesive in the manufacture of oriented strandboard or the like composite boards. By the term monohydroxylic is meant that there is only one hydroxyl group attached to an aromatic carbon ring. This is in contrast to dihydroxylic which has two hydroxyl groups attached to the aromatic carbon ring, e.g., such as with resorcinol. Such monohydroxylic resole resins can be high or low condensed resins. Typical resins include saturating resins, hardboard resins, particleboard resin, plywood resin, fiberboard resins, strandboard resins, glass binder, or other industrial monohydroxylic resole resins.

The resole resins may be obtained by the reaction of phenol, cresols, 3,5-xylenol, bisphenol-A or other monohydroxylic substituted phenols or mixtures thereof with aldehydes such as formaldehyde, acetaldehyde or furaldehyde. These resins are referred to as aqueous since the solids are dissolved in water or water together with minor amounts, e.g., less than about 5% or 10% by weight of a non-reactive solvent such as alkanols of 1 to 4 carbon atoms, glycols of about 2 to 4 carbon atoms, etc.

The reaction in the manufacture of the monohydroxylic phenolic or such phenolic derivative with aldehyde for production of the resole resin used in this invention takes place in the presence of alkaline materials such as sodium hydroxide, potassium hydroxide or ammonia. The preferred resole resin is the condensation product of phenol and formaldehyde or wherein only a portion such as less than half of the phenol or formaldehyde is substituted with another monohydroxylic phenolic derivative or other aldehyde.

Typically, the molar ratio of formaldehyde or other aldehyde to phenol or other monohydroxylic phenolic derivative in the resole resin is about 1:1 to 3:1 and preferably from about 1.8 to 2.5 moles of the aldehyde for each mole of the phenol or monohydroxy phenolic derivative. The resole resin has an alkalinity content, i.e., contains a base, in the range of 0.5% to about 15%, and preferably 1% to 12%, based on the weight of the resin solution, when the base is sodium hydroxide. Thus, the term "alkalinity content" or simply "alkalinity" is based on sodium hydroxide solids. When a different base is used, the alkalinity content is proportionally equivalent on a molar weight basis. For example, to attain a 4% sodium hydroxide equivalent weight alkalinity content, it requires 4 grams of sodium hydroxide in 100 grams of resin solution, but 5.61 grams of potassium hydroxide in 100 grams of the resin are required to attain the same alkalinity content. Additional base can be added to a resole resin after manufacture in order to bring it to the desired alkalinity content. The pH of the resole resin will be at above 8, preferably above 9, and particularly above 10.

The resole resin used in this invention will have a resin pan solids content of about 20% to 75% by weight and preferably about 45% to 60%. Generally, the viscosity should be such as to permit the solution to be sprayed on the cellulosic components such as flakes or strands or to otherwise be applied to the components such as veneer. Thus, the viscosity of the resole resin component will generally vary from about 50 to about 1,000 centipoise at 25° C. as determined by a Brookfield RVF viscometer with a number 2 spindle at 20 revolutions per minute at 25° C. and preferably from about 100 to 300 cps at 25° C. when used with particulate components such as strands.

The free formaldehyde in the resole resin used in this invention will typically be less than about 0.3% and preferably less than about 0.1% by weight of the resin.

A typical resole resin which can be used in this invention can be prepared as follows: To a clean reactor, charge 26 parts of phenol, 36.5 parts 50% formaldehyde in water, 17.5 parts water, and 6 parts 50% sodium hydroxide in water, all by weight. Heat the mixture to 90° C. and react to 500 cps Brookfield viscosity, when measured at 25° C. Cool to 75° C. and charge 6 parts of 50% sodium hydroxide. React to 600 cps at 25° C. Brookfield. Cool to room temperature. Charge 8 parts urea, and mix until dissolved. Finished specifications would be: 50% resin solids; 6% alkalinity; viscosity of 100–200 cps at 25° C.; and a molar ratio of 2.2 moles of formaldehyde for each mole of phenol.

The Resorcinolic Resin

The resorcinolic resins used in this invention are made with an aldehyde to resorcinol molar ratio of 0.2 to 1.0 and preferably about 0.5 to 0.8 moles of aldehyde per mole of resorcinol. Illustrative of aldehydes which can be used there can be mentioned formaldehyde and acetaldehyde. Sodium hydroxide or other alkaline catalysts as well as modifiers such as those listed with the monohydroxylic phenolic resole resins are generally used in the manufacture of the resorcinolic resins. In addition to the resorcinol and aldehyde, the resorcinolic resins can also contain monomers copolymerizable therewith such as phenol. The quantity of phenol copolymerized in the resorcinolic resin can vary over a broad range. Thus, as much as 60 parts by weight of phenol based on 50 parts of resorcinol can be copolymerized in the resorcinolic resin. When phenol is copolymerized with the resorcinol, the quantity of aldehyde used for reacting with the phenol is about the same as that set forth above for the resorcinol. Generally, the quantity of phenol in the resorcinolic resin will be no more than equal to that of the resorcinol. Preferably the quantity of phenol is less than 25 and particularly less than 10 parts of phenol for each 50 parts of resorcinol.

The resorcinolic resins are described as precondensates or partially reacted since they need additional formaldehyde or methylene groups to cure. The pH of the resorcinolic resin will vary from about 6 to 9 and preferably from about 6.5 to 8.5.

The viscosity of the resorcinolic resin can vary over a wide range such as that of about 40 cps to 1000 cps at 25° C. For use with particulate components such as strands, the viscosity will generally vary from about 50 to about 300 cps at 25° C. For use with veneers, the viscosity will generally be higher up to about 1,000 cps at 25° C. Since the resorcinolic resin is made with a deficiency of aldehyde, such resin gains viscosity to a certain point and then stops. The point at which viscosity increase ceases is generally determined by the aldehyde to resorcinol molar ratio.

The resorcinolic resins used in this invention can be those which are used for laminating wood and in the manufacture of structural wood products. Such resins are preferably made with formaldehyde but other aldehydes such as acetaldehyde or furaldehyde can be used.

A resorcinolic resin useable in this invention to which a catalyst for the resole resin is added can be prepared as follows: To a clean reactor, charge 21 parts of water, 33 parts of resorcinol and about 0.75 parts of a 50% aqueous sodium hydroxide solution and heat the mixture to about 55° C. Ten and one-half parts of an aqueous solution containing 50% of formaldehyde is added slowly at about 55° C. to 60° C. Additional solution of sodium hydroxide (50% in water), 2.3 parts, and 14 parts of water are added and the mixture is heated to 80° C. to 85° C. until the viscosity stabilizes. The solution is then cooled and 17 parts of triacetin and one part of propylene glycol are added. All parts and percentages are by weight. This resorcinolic resin will have: a molar ratio of about 0.71 moles of formaldehyde per mole of resorcinol; a pH of about 7.2 to 7.8; a Brookfield viscosity of about 70 to 100 cps at 25° C.; and about 50% solids.

When catalyst is in the composition of the Part Two resorcinolic resin, the resulting mixture is stable in that the catalyst will not promote cross-linking of the resorcinolic resin. Also, the catalyst itself is relatively stable in the resin although there is some degradation of the catalyst with time. The mixture of resorcinolic resin and catalyst of Part Two is stable over a period of weeks or more.

Methylene Donors for the Resorcinolic Resin

Illustrative of methylene donors, also referred to as formaldehyde donors or cross-linking agents, which are placed in the Part One component of the adhesive and which do not affect stability of the resole resin and do not fume in such resin, there can be mentioned materials which have a methylol group as well as materials which do not have a methylol group.

Illustrative of such methylene donors which do not have a methylol group there can be mentioned: trioxane; hexamine; ethylene diamine/formaldehyde product such as 1,4,6,9-tetraza-tricyclo-(4.4.1.1)-dodecane; cyclic triformals such as ethyleneamine triformal, and triformaldehyde glycerine ester; as well as certain oxazolidines.

Illustrative of such methylene donors which have a methylol group there can be mentioned: methylolated mono- and dialkylamines such as methylol methylamine (methylaminomethanol), or dimethylaminomethanol; methylolated amides such as mono- and dimethylol formamide, methylol acetamide, or N-methylolacrylamide; methylolated imides such as N-methylol succinimide or N-methylol phthalimide; methylolated polyamides such as N-methylol polyhexamethylene adipamide; methylolated urethane; methylolated protein; urea-formaldehyde complexes such as methylolated ureas, e.g., monomethylolurea and dimethylolurea, methylolated condensed urea such as methylolated methylene diurea and methylolated substituted ureas such as methylol dimethyl urea; methylolated phenol; methylolated melamine, or melamine precursors such as dicyandiamide; methylolated thiourea, and condensed thiourea such as methylol methylenethiourea; methylolated nitromethane; dimethylol glycine anhydride; and methylol hydantoin; as well as certain oxazolidines. The term urea-formaldehyde complexes as used herein refers to low molecular weight combinations of urea and formaldehyde in contrast to resinous urea-formaldehyde In preparing the Part One component there is added to the resole resin an amount of methylene donor necessary to crosslink the resorcinolic resin. This amount can vary from about 0.3% to 15% by weight of the liquid resole resin, preferably in the range of 0.8% to 10% and particularly about 1% to 5%. The methylene donor will not catalyze the resole resin and the mixture exhibits viscosity stability typical of an unmodified monohydroxylic resole resin. The methylene donor itself is stable in the Part One resin. This is in contrast to methylene donors such as formaldehyde and paraformaldehyde which fume and release formaldehyde to the environment when placed in the resole resins used in this invention. A preferred way for preparing Part One component is to prepare the methylene donor in situ as part of the manufacture of the resole resin. This is easily accomplished by adding excess formaldehyde during the manufacture or at the end of the manufacture of the resole resin and further adding urea to the resole resin so as to react with the excess formaldehyde.

The Oxazolidine Methylene Donor

Preferred classes of methylene donors are the oxazolidines and urea-formaldehyde complexes. Any oxazolidine can be used in this invention as long as it has minimal or no effect on the stability of the aqueous monohydroxylic phenolic resole resin of Part One and reacts with the resorcinolic resin on mixing of the Part One and Part Two components of the adhesive.

A review of oxazolidine chemistry appears in Chemical Reviews 53, 309–352 (1953). Illustrative of suitable oxazolidines there can be mentioned the various 1,3-oxazolidines shown in U.S. Pat. No. 3,281,310 of Oct. 25, 1966 to Danielson which is incorporated herein in its entirety by reference; and those of U.S. Pat. No. 3,256,137 of Jun. 14, 1966 to Danielson which is also incorporated herein in its entirety by reference.

The compounds of the U.S. Pat. No. 3,281,310 patent wherein the nitrogen is part of only one ring can be represented the formula:

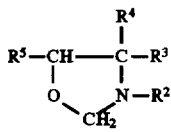

wherein $R^2$ is hydrogen, alkyl of 1 to 8 carbon atoms, hydroxyalkyl of 1 to 8 carbon atoms, benzyl, or phenylcarbamyl, and each of $R^3$, $R^4$, and $R^5$ is hydrogen or an alkyl of 1 to 8 carbon atoms. Illustrative of such oxazolidines there can be mentioned: 4,4-dimethyl-1,3-oxazolidine; 3-(2-hydroxyethyl)-1,3-oxazolidine; 3-(2-hydroxypropyl)-5-methyl-1,3-oxazolidine; 5-methyl-1,3-oxazolidine; 3-ethyl-1,3-oxazolidine; 3-benzyl-1,3-cyclohexyl-5-methyl-1,3-oxazolidine; 3-phenylcarbamyl-4,4-dimethyl-1,3-oxazolidine; as well as the corresponding bis(1,3-oxazolidino)methanes such as bis(4,4-dimethyl-1,3-oxazolidino)methane.

The oxazolidine compounds of the U.S. Pat. No. 3,256,137 patent wherein the nitrogen is directly attached to a first and a second ring of a bicyclic heterocycle can be represented by the formula:

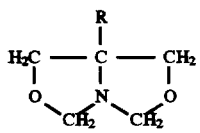

wherein R is hydrogen, methyl, ethyl, n-propyl, isopropyl, methylol, beta-hydroxyethyl, acetoxymethyl or methoxymethyl. Illustrative of such oxazolidines there can be mentioned:

1-aza-3,7-dioxabicyclo[3.3.0]octane;
1-aza-5-methyl-3,7-dioxabicyclo[3.3.0]octane;
1-aza-5-ethyl-3,7-dioxabicyclo[3.3.0]octane;
1-aza-5-n-propyl-3,7-dioxabicyclo[3.3.0]octane;
1-aza-5-isopropyl-3,7-dioxabicyclo[3.3.0]octane;
1-aza-5-methylol-3,7-dioxabicyclo[3.3.0]octane;
1-aza-5-acetoxymethyl-3.7-dioxabicyclo[3.3.0]octane; and
1-aza-5-methoxymethyl-3.7-dioxabicyclo[3.3.0]octane.

The preferred oxazolidines are: 1-aza-5-ethyl-3,7-dioxabicyclo[3.3.0]octane such as that under the trademark AMINE CS-1246; 1-aza-5-methylol-3,7-dioxabicyclo[3.3.0]octane such as that under the trademark ZOLDINE ZT-55; and 4,4-dimethyl-1,3-oxazolidine such as that under the trademark AMINE CS-1135, all of which are supplied by Angus Chemical Company. The oxazolidines can be with or without a methylol group attached thereto.

Catalysts for the Alkaline Phenolic Resole Resin

Illustrative of materials which will catalyze the aqueous alkaline phenolic resole resin solution of Part One, there can be mentioned organic ester functional catalysts as well as carbamates. Thus, to the resorcinolic resin of the Part Two component is optionally added a catalyst for the resole resin which takes effect on mixing of the two parts of the adhesive. The amount of catalyst can vary from about 1% to 30% by weight of the resorcinolic resin but preferably in the range of 5% to 25% and particularly from about 10% to 20%. The catalyst will not catalyze the viscosity increase of the resorcinolic resin and the mixture exhibits stability typical of an unmodified resorcinolic resin.

Ester Functional Catalysts

Catalysts for the resole resin, which can be included in the Part Two component containing the resorcinolic resin, can be ester functional catalysts such as cyclic organic carbonates, lactones or carboxylic acid esters and mixtures thereof.

Examples of suitable lactones include, but are not limited to: gamma-butyrolactone; gamma-valerolactone; beta-propiolactone; beta-butyrolactone; beta-isobutyrolactone, beta-isopentyl lactone; gamma isopentyl lactone, delta-pentyl lactone, and mixtures thereof. It is preferred to use gamma-butyrolactone.

Examples of suitable cyclic organic carbonates include: propylene carbonate; ethylene carbonate; ethylene glycol carbonate; glycerol carbonate; 1,2-butanediol carbonate, 1,3-butanediol carbonate; 1,2-pentanediol carbonate; 1,3-pentanediol carbonate; and mixtures thereof. If a cyclic organic carbonate is utilized, it is preferred to use propylene carbonate.

The carboxylic acid ester catalysts are preferably those of aliphatic esters of alcohols having about 1 to 4 carbon atoms. The alcohols can be mono-, di-, or trihydric alcohols, saturated or unsaturated and which are esterified with aliphatic acids of 1 to 4 carbon atoms which can be saturated or unsaturated, mono- or dicarboxylic. In preparing the carboxylic acid ester, the reactants should be chosen so that a long chain polyester is not formed. Aliphatic monoesters which can be used include: $C_1$ to $C_4$ alkyl propionates; $C_1$ to $C_4$ alkyl formates; $C_1$ to $C_4$ alkyl acetates; $C_1$ to $C_4$ alkyl butyrates; $C_1$ to $C_4$ alkyl pentanates. Examples of suitable carboxylic acid esters include: methyl formate; methyl acetate; ethyl acetate; methyl lactate; ethyl lactate; n-butyl acetate; butylene glycol diacetate; ethylene glycol diacetate; and triacetin (glycerol triacetate); dimethyl adipate; dimethyl gluterate; dimethyl succinate and mixtures thereof.

Generally, it is preferred to use an ester functional catalyst which contains a total of 3 to 9 carbon atoms. However, the only requirement of the ester functional curing agent is that it be dispersible in the resole resin and capable of remaining in suspension long enough to effect curing.

The Carbamate Catalysts

The carbamate catalysts for the resole resin can be a carbamate which is disclosed in U.S. Pat. No. 4,977,231 of T. McVay et al which issued on Dec. 11, 1990 and which is incorporated herein in its entirety by reference. Thus, the carbamate can be a reaction product of (a) a carbonate selected from the group consisting of alkylene, glycidol, and epoxy resin carbonate and (b) ammonia. Of particular interest are the carbamates having 2 to 6 carbon atoms. e.g., hydroxyethyl carbamate, hydroxypropyl carbamate, and the like.

Resin Mixtures

The mixture of the two-part adhesive with each other can contain about 1% to 30% by weight of the resorcinolic resin part (Part Two) mixed with 99% to 70% by weight of the resole resin part (Part One). Preferably, Part One will be from about 95% to about 80% of the adhesive mixture with Part Two being from about 5% to 20%. The ratio of 18% of the resorcinolic resin part, Part Two, and 82% of the resole resin part, Part One, appears to be the upper limit of economic performance under conventional hot pressing conditions. At a ratio of 15% resorcinolic resin and 85% resole resin the cure speed performance is equivalent to PMDI. At ratios lower than 15:85, performance is gradually decreased to that of a conventional resole resin at 0:100. This gives the user the ability to adjust the ratio to the cure speed performance needed. The more expensive higher mix ratio of resorcinolic resin to resole resin could be used on thick panel constructions, or with wetter wood when maximum cure speed performance is needed. The more economical lower mix ratio could be used on the inner construction when maximum cure speed is not needed.

The mixture of the two-part adhesive will have a pH of at least 8 and preferably at least 9 or 10.

Additives

Suitable additives can be used in coating the raw lignocellulosic material. Thus, from 0.25 to 3% by weight, based on the weight of the oven dry wood on the board product, of molten slack wax as well as emulsified wax can be used. Still further, from 5% to 20% by weight, based on the weight of the oven dry wood in the board product, of a suitable plasticizer may be included. Suitable plasticizers include glycol esters, glycerine esters, phosphate esters and the like.

Thickeners such as the various gums, starches, protein materials and clays may be used together with the resins. The resins can have additives dissolved therein. Illustratively urea is often dissolved in the resole resin in order to decrease the resin viscosity. The quantity of urea can vary over a broad range such as from about 5% to 15% based on the weight of the resole resin solution containing the urea and preferably from about 8% to 12% thereof. In addition to reducing viscosity, the urea also acts as a formaldehyde scavenger for the resole resin. In the case of phenol-formaldehyde resole resins the resin will also generally contain a small quantity of methanol, typically less than about 1% such as about 0.5% or less.

Application of the Adhesive

As is conventional in the art, the resin is applied to fibers, flakes, chips, strands and the like by various spraying techniques whereas it is generally applied to veneers by coaters. Resin applied to the lignocellulosic components is referred to herein as a coating even though it may be in the form of small resin particles such as atomized particles which do not form a continuous coating.

The mix ratios listed above in the Resin Mixtures section allows easy handling in an in-line meter mix system as outline in U.S. Pat. No. 4,961,795 to Detlefsen and Phillips of Oct. 9, 1990 and which is incorporated herein in its entirety by reference. When used with an in-line mixer, as described in the above 795 patent, the adhesive part containing the mixture of resorcinolic resin and catalyst for the Part One component is mixed with the Part Two component containing the resole resin and cross-linking agent for the resorcinolic resin and the mixture of the two parts applied to wood strands, veneer or wood particles for the manufacture of composite board such as oriented strandboard, particleboard, fiberboard, or used for plywood construction. In some operations, however, batch mixing of the two resin components and use of the resulting mixture before the viscosity becomes excessive is possible. This can be the case in a plywood operation where fairly viscous glue mixes are used.

The resulting mixed adhesive has a very short boiling water gel time when compared to a conventional resole resin. The ratio of the two resins in the adhesive mixture can be varied to obtain the level of catalysis required. At a blend ratio of 85 parts of the Part One component and 15 parts by weight of the Part Two component the resulting adhesive has hot press cure times equivalent to PMDI.

The mixture of Part One and Part Two adhesive can be applied to the wood with any form of conventional equipment currently in use. Such equipment includes spray nozzles, atomizing wheels, roll coaters, curtain coaters and foam applicators. It is important for successful use, however, in obtaining a relatively short time interval between mixing of the two parts of the adhesive and application of the mixture to the wood. This is because the viscosity of the mixture begins to rapidly increase and may result in loss of solubility in water and base shortly after mixing. For these reasons, in-line mixing of the first and second parts of the adhesive just prior to application to the wood is preferred.

The range of resin solids for the total of resorcinolic resin and the resole resin from the two components before curing which are applied to the lignocellulosic components can vary from about 1% to 15% by weight of the lignocellulose depending of the quality of the panel product desired. Preferably, the amount of binder can vary from about 2% to about 8% of resin solids in each of the components based on the weight of the lignocellulose being bound. The resin solids includes the catalysts.

Hot pressing conditions for the panels utilizing the two-part adhesive of this invention will depend on the thickness of the board, the type of board, as well as on the resin characteristics. Generally, the platen temperatures can vary form about 240° F. to 420° F. at pressures of about 75 to 250 psi for about 2 to 10 minutes.

The Lignocellulosic Materials

The lignocellulosic materials which are the basic raw materials for panels which can be made from the adhesives of this invention may be derived from a large number of natural sources. They may be derived, for example, from sugar cane bagasse, straw, cornstalks, and other waste vegetable matter. In particular however, they are derived form various species of wood in the form of wood fibers, chips, shavings, flakes, particles and veneers. These materials which are used to prepare the panels are referred to generally herein as lignocellulosic components. The manufactured products include hardboard, particleboard, fiberboard, waferboard, strandboard and the like as well as plywood, laminated veneer lumber or laminated wood particles. The internal bond strength of these products will be at least about 30 pounds per square inch (psi).

The invention will be demonstrated by the following examples. In these examples and elsewhere through the specification, parts and percentages are by weight unless expressly indicated otherwise. Also, the term "resin solids" refers to pan solids according to an industry accepted test where one gram of resin is placed in an aluminum pan and heated in a forced air oven at 125° C. for one hour and 45 minutes. Such solids include catalysts, e.g. esters and carbamates well as well as methylene donors such as oxazolidine and urea-formaldehyde complexes.

PROCEDURES AND EXAMPLES

Boiling Water Gel Tests. The boiling water gel tests to determine gel time were conducted with a Gel Time Meter, Catalog No. 22 of Sunshine Scientific Instrument of 1810

Grant Avenue, Philadelphia, Pa. The gel-time meter essentially consists of a motor-driven, rotating spindle suspended in the test sample. The sample is maintained at constant temperature by a boiling bath surrounding the sample cell. In this case, the boiling bath was that of water so that the temperature was 100° C. At the gel point, the very pronounced increase in viscosity of the sample stops the rotating spindle, closing an electrical switch which actuates the timing and alarm circuits. In operation, the sample tube containing a 10 gram sample, unless otherwise indicated, and the spindle are placed in the briskly boiling water bath. At the same time, the power switch is turned on, starting the counter and the slowly rotating spindle device. The spindle is locked into the spindle drive by magnetic coupling. The test switch is turned on, setting up the automatic counter stop and alarm circuits. The instrument needs no further-attention for the duration of the test. When the gel point is reached, the increased viscosity of the test sample stops the rotating spindle and the actuating switch is closed. This switch shuts off the spindle motor and the counter, and actuates the visible and audible signal. The gel time and the bath temperature are then recorded by the operator, and the test is complete.

EXAMPLE 1

This example illustrates preparation of the two-part adhesive wherein the first part is that of a mixture of an aqueous alkaline monohydroxylic phenolic resole resin solution (PF) and an oxazolidine and the second part is phenol-resorcinol-formaldehyde co-condensed aqueous resin solution (PRF) without ester catalyst for the resole resin. The resole resin is referred to as WS474-101 and is made with phenol, formaldehyde, water, and sodium hydroxide, with 7.2% urea added in the finished polymer. The pH of this resole resin was 11.95. AMINE CS 1246, namely, 1-aza-5-ethyl-3,7-dioxabicyclo[3.3.0]octane, an oxazolidine supplied by Angus Chemical Company, is added to attain a 10% by weight concentration in the resin. The final resin has a pan solids of 51%, an alkalinity of 7% NaOH, molar ratio of 2.25:1 of formaldehyde to phenol, and 150 cps Brookfield viscosity. The phenol-resorcinol resin, referred to as WS453-88, is made with phenol, resorcinol, formaldehyde, water and sodium hydroxide. The resulting resorcinolic resin has pan solids of 50%, alkalinity of 3.5% NaOH, a molar ratio of 0.95:1 of formaldehyde to phenol-resorcinol, and 200 cps Brookfield viscosity.

EXAMPLE 2

This example shows a two-part adhesive wherein the first part it that of an aqueous alkaline monohydroxylic phenolic resole resin solution and the second part is an aqueous polymerizable resorcinolic resin (RF) wherein each part carries a catalyst for the other part. The resole resin (PF), referred to as WS421-110, is made with phenol, formaldehyde, water, and sodium hydroxide, with urea added to the finished polymer to provide a resin having 10.8% urea and a pH of 12. ZOLDINE ZT55, namely, 1-aza-5-methylol-3,7-dioxabicyclo[3.3.0]octane, an oxazolidine supplied by the Angus Chemical Company, is added within the preferred range. The final resin, including the oxazolidine and urea has pan solids of 50%, alkalinity of 7% NaOH, molar ratio of 2.3:1 of formaldehyde to phenol, and a viscosity of 110 cps at 25° C. Brookfield viscosity. Part two is a resorcinolic resin, referred to as WS421-109, which is made with resorcinol, formaldehyde, water, and sodium hydroxide. Triacetin, an ester, is added to the resorcinolic resin to provide a resin having 17% of triacetin. The resorcinolic resin had pan solids of 51%, alkalinity of 1.5% NaOH, a molar ratio of 0.58:1, formaldehyde to resorcinol, a pH of 7.6, and a viscosity of 80 cps at 25° C. Brookfield viscosity.

EXAMPLE 3

Different ratios of the two stable resin-catalyst mixtures from Example 2 were tested to determine boiling water gel time. The samples were hand mixed immediately before testing. The tests were run on 5 gram samples of the resin catalyst mixtures using a Sunshine Gel Meter with boiling water as the heating medium. The results of this example are shown in Table 3 wherein the column on the left shows the resorcinol-formaldehyde part to phenol-formaldehyde resole part proportions in parts by weight and the right hand column shows the gel time in minutes (min).

TABLE 3

| RF:PF | Boiling Water Gel Test |
|---|---|
| 0:100 | 28 min. |
| 5:95 | 13.1 min. |
| 10:90 | 4.8 min. |
| 15:85 | 1.7 min. |
| 20:80 | 1.5 min. |

It can be seen from Table 3 that the mixture of resorcinol-formaldehyde resin and ester catalyst is very effective in reducing the gel time of the system to the point where factors other than the catalytic effect such as heat transfer into the sample, become controlling.

EXAMPLE 4

Laboratory strandboards were made with the phenolic resole resin mixture of Example 1, also referred to as PF in Table 4, with the resorcinolic resin of Example 1, also referred to as PRF in Table 4. These were mixed in the ratio of 50:50 by weight. The pH of the mixed resins was at least about 10. Resole Resin A was also tested for comparison purposes and as a control. Resin A is an aqueous solution of a phenol-formaldehyde resole resin having: a molar ratio of about 2.2 moles of formaldehyde per mole of phenol; 47% solids; Brookfield viscosity of about 200 cps at 25° C.; a pH of about 12.5; less than 0.5% of free phenol; less than 0.2% of free formaldehyde; which was made with sodium hydroxide as the base and which contains 8% of urea which was added after the resin cooled. The dimensions of the boards were 14×14×0.75 inches. They were pressed in an oil-heated laboratory hot press set at 390° F. Target board density was 40 pcf, and the wood was southern pine strands with minor amounts of mixed southern hardwoods. The wood moisture before resin application was 9% and 14% after resin application. The boards had random strand orientation, and were homogeneous in construction. The resins were mixed by hand just prior to use and applied to the strands in a laboratory rotating blender using air atomization. The resins were applied at the rate of 5% resin solids to dry wood weight. Press cycle times, including press closing and board degas, were adjusted to determine cure speed of the resins. This was done by examining board edges and corners for weakness immediately out of the press. The results of this example are shown in Table 4 wherein the first three series of results are for the Resin A and the second three series are for the mixture of the two-part adhesive of Example 1.

TABLE 4

| Resin | Cycle (min) | IB (psi) | MOR (psi) | 6-Cycle MOR (psi) | TS (%) |
|---|---|---|---|---|---|
| Resin A | 7.5 | 39 | 2971 | 1296 | 12.7 |
|  | 7.0 | 46 | 2033 | 1711 | 11.4 |
|  | 6.5 | 26 | 1780 | 1389 | 13.2 |
| PRF:PF | 5.0 | 39 | 2852 | 1452 | 10.5 |
| 50:50 | 4.5 | 40 | 2648 | 1793 | 11.0 |
|  | 4.0 | 26 | 2049 | 1527 | 12.6 |

The data of the above Table 4 show that the inventive mixture of this invention is much faster curing than the control commercial resin, which is the fastest curing conventional monohydroxylic phenolic resole resin that the supplier of that resin markets. In the above Table 4, IB refers to internal bond, MOR refers to modulus of rupture, 6-cycle MOR refers to modulus of rupture after six cycles of soaking and drying (durability), and TS refers to thickness swell after 24 hours cold soak in water.

EXAMPLE 5

Laboratory strandboards were made with the resins from Example 2 mixed in various ratios by weight, using a monohydroxylic phenolic resole resin solution designated as Resin B as a control resin. The pH of the mixture of resins was about 10 to 11. Resin B has a molar ratio of about 2.2 moles of formaldehyde per mole of phenol; 47% solids; brookfield viscosity of about 100 cps at 25° C.; a pH of about 13; less than 0.5% free phenol; less than 0.1% of free formaldehyde; and which was made with sodium hydroxide as the base. Resin B contains 9.4% formaldehyde which was added after the condensation of the phenol and formaldehyde. The boards were manufactured as in Example 4, except that a press temperature of 400° F. was used, and wood moisture was lower, i.e., 3% before resin application.

TABLE 5

| Adhesive | Cycle (min) | IB (psi) | MOR (psi) | 6-CYCLE MOR (psi) |
|---|---|---|---|---|
| Resin B | 6.0 | 69 | 3516 | 1358 |
|  | 5.5 | 58 | 3164 | 1817 |
|  | 5.0 | 45 | 2520 | 1165 |
|  | 4.5 | 29 | 1659 | 1268 |
| RF:PF | 4.5 | 73 | 3298 | 1927 |
| 12:88 | 4.0 | 73 | 3916 | 2234 |
|  | 3.5 | 58 | 3157 | 1863 |
|  | 3.0 | 45 | 2452 | 1640 |
| RF:PF | 4.5 | 77 | 3059 | 2153 |
| 15:85 | 4.0 | 68 | 3479 | 1971 |
|  | 3.5 | 63 | 3161 | 1651 |
|  | 3.0 | 46 | 2614 | 1918 |
| RF:PF | 4.5 | 75 | 3732 | 2174 |
| 18:82 | 4.0 | 79 | 3620 | 2054 |
|  | 3.5 | 66 | 3497 | 2034 |
|  | 3.0 | 58 | 3021 | 2026 |

The data of the above Table 5 show that the examined range of experimental mix ratios were all much faster curing than the control resin. They also show that higher ratios of the resorcinol component give better bonding at the shortest press cycles.

EXAMPLE 6

Laboratory boards were made as in Example 5 with the following changes: aspen strands were used with moisture content of 9–10% before resin application; press temperature was 260° F.; Resin A, which was also used in Example 4, was again used as a control. Wood moisture was 14% after resin application. The results of this example are shown in Table 6.

TABLE 6

| Adhesive | Cycle (min) | IB (psi) | MOR (psi) | 6-CYCLE MOR (psi) |
|---|---|---|---|---|
| Resin A | 13 | 37 | 2840 | 802 |
|  | 12 | 36 | 2459 | 790 |
|  | 11 | 24 | 1492 | 575 |
|  | 9 | 8 | 653 | 331 |
| RF:PF | 10 | 60 | 2760 | 2013 |
| 18:82 | 9 | 51 | 2932 | 2095 |
|  | 8 | 47 | 2776 | 1864 |
|  | 7 | 29 | 2178 | 1331 |

The data of the above Table 6 show that the experimental adhesive of the invention is very moisture tolerant, and will cure at low press temperature, even at short press cycles.

EXAMPLE 7

In this example, tests were made to compare oxazolidine with hexamine (hexamethylenetetramine) as formaldehyde donors. This was done by noting the time for the boiling water gel test of Sample 1 which contained 85 parts of Component A and 15 parts of Component E with Sample 2 which contained 85 parts of Component B and 15 parts of Component E. The composition of these various Components is described below. As can be seen from the first part of Table 7, there was about the same degree of catalysis when the hexamine was used on an equivalent basis with the ZT-55 (oxazolidine). Also, in the second part of this example, tests were made with methylolurea as the formaldehyde source. The resole resin (Component C) contained about 0.1% of free formaldehyde. It can be seen from a comparison of Sample 3 and Sample 4 in Table 7 that combining the resole resin of Component C with the resorcinolic resin of Component F gave a shorter Boiling Water Gel time. When 15 parts of resorcinolic resin, (Component F) was mixed with 85 parts of Component D which is the resole resin which included 5% of the fifty percent aqueous formaldehyde solution and 10% of urea, the boiling water gel time was down to 2.2 minutes. In Sample 6, which had a mixture of 85 parts of the resole resin containing methylolurea from the reaction of urea and formaldehyde (Component D) and 15 parts of the resorcinolic resin containing triacetin Component E), the boiling water gel time was only one minute.

Component

A WS421-110 containing 2.22% of ZT-55 oxazolidine which in turn is a 43% solution of the oxazolidine in water.

B WS421-110 containing 3.00% hexamine solution which in turn is a 43% solution of the hexamine in water.

C This is a monohydroxylic phenolic resole resin of phenol and formaldehyde having 43% pan solids, a pH of 11.7 and a nominal viscosity of 750 cps at 25° C.

D This is the resin of Component C above plus 5% of 50% aqueous formaldehyde and 10% of urea.

E WS421-109 (resorcinolic resin describe in Example 2) together with 3% triacetin as catalyst for the resole resin.

F WS421-109 without ester of Component E above.

| Hexamine Sample | Components | Boiling Water Gel Time |
|---|---|---|
| 1 | A 85 parts<br>E 15 parts | 1.3 minutes |
| 2 | B 85 parts<br>E 15 parts | 1.2 minutes |
| Methylolurea | | |
| 3 | C 100 parts | 25 minutes |
| 4 | C 80 parts<br>F 12.5 parts | 19.9 minutes |
| 5 | D 85 parts<br>F 12.5 parts | 2.2 minutes |
| 6 | D 85 parts<br>E 15 parts | 1.0 minute |

EXAMPLE 8

In this example boiling water gel tests were made to show the synergism of the cross-catalysis. In this example, boiling water gel tests were made on each of the resole and resorcinolic resins alone carrying catalysts for the other part as well as combinations of such resins and catalysts. The designator PF in Table 8 is the WS421-110 base resin of Example 2 above with no methylene donor and the designator RF is the WS110-109 base resin of Example 2 above with no catalyst. The amount of each catalyst or methylene donor employed in Table 8 is the same as that in Components A and E of Example 7 above at a mix ratio of 15 parts of the resorcinolic resin and 85 parts of the resole resin.

TABLE 8

| Sample | Boiling Water Gel Time |
|---|---|
| 1 PF + oxazolidine | 29.1 minutes |
| 2 PF + triacetin | 11.3 minutes |
| 3 PF + RF + oxazolidine | 3.3 minutes |
| 4 PF + RF + oxazolidine + triacetin | 1.3 minutes |

EXAMPLE 9

Tests were made for boiling water gel time by adding various chemicals to resorcinolic resin WS421-126 which of itself has no boiling water gel time. The results of these tests are shown in Table 9 below.

TABLE 9

| Additive | Percent Addition | Boiling water Gel Time |
|---|---|---|
| Dimethylolurea | 20% | 1.9 minutes |
| N-Methylolacrylamide | 15% | 11.4 minutes |
| Tris-hydroxy-methyl-nitromethane | 20% | 3 minutes |

What is claimed is:

1. A method for polymerizing a monohydroxylic phenolic resole resin together with a resorcinolic resin precondensate having a shortage of formaldehyde which comprises mixing:

A. from about 70 to 99 parts of a first component having a pH of at least about 9 and comprising a stable aqueous, alkaline monohydroxylic phenolic resole resin solution containing from about 0.3% to 15% based on the weight of the resole resin solution of a methylene donor; with B. from about 1 to 30 parts of a second component comprising a stable aqueous resorcinolic resin precondensate having a shortage of formaldehyde and a pH of about 6 to 9.

2. The method of claim 1 wherein the methylene donor is an oxazolidine.

3. A method for polymerizing a monohydroxylic phenolic resole resin together with a resorcinolic resin precondensate having a shortage of formaldehyde which comprises mixing:

A. from about 70 to 99 parts of a first component having a pH of at least about 9 and comprising a stable aqueous, alkaline monohydroxylic phenolic resole resin solution containing from about 0.3% to 15% based on the weight of the resole resin solution of a methylolurea; with B. from about 1 to 30 parts of a second component comprising a stable aqueous resorcinolic resin precondensate having a shortage of formaldehyde and a pH of about 6 to 9.

4. A method for production of lignocellulosic panels by bonding lignocellulosic components under heat and pressure which comprises coating lignocellulosic components with an adhesive comprising a mixture of:

A. about 70 to 99 parts of a first component comprising a stable aqueous, alkaline monohydroxylic phenolic resole resin solution containing from about 0.3% to 15%, based on the weight of the resole resin of a methylene donor; and B. about 1 to 30 parts of a second component comprising a polymerizable resorcinolic resin containing from about 1% to 30%, based on the weight of the resorcinolic resin, of a catalyst for the resole resin said catalyst selected from the group consisting of an ester functional catalyst and a carbamate which is the reaction product of a carbonate selected from the group consisting of alkylene, glycidol, and an epoxy resin carbonate with ammonia.

* * * * *